Oct. 17, 1967  S. A. MENCACCI ETAL  3,347,351
HYDROSTATIC COOKER BARS
Filed Aug. 20, 1964  8 Sheets-Sheet 1
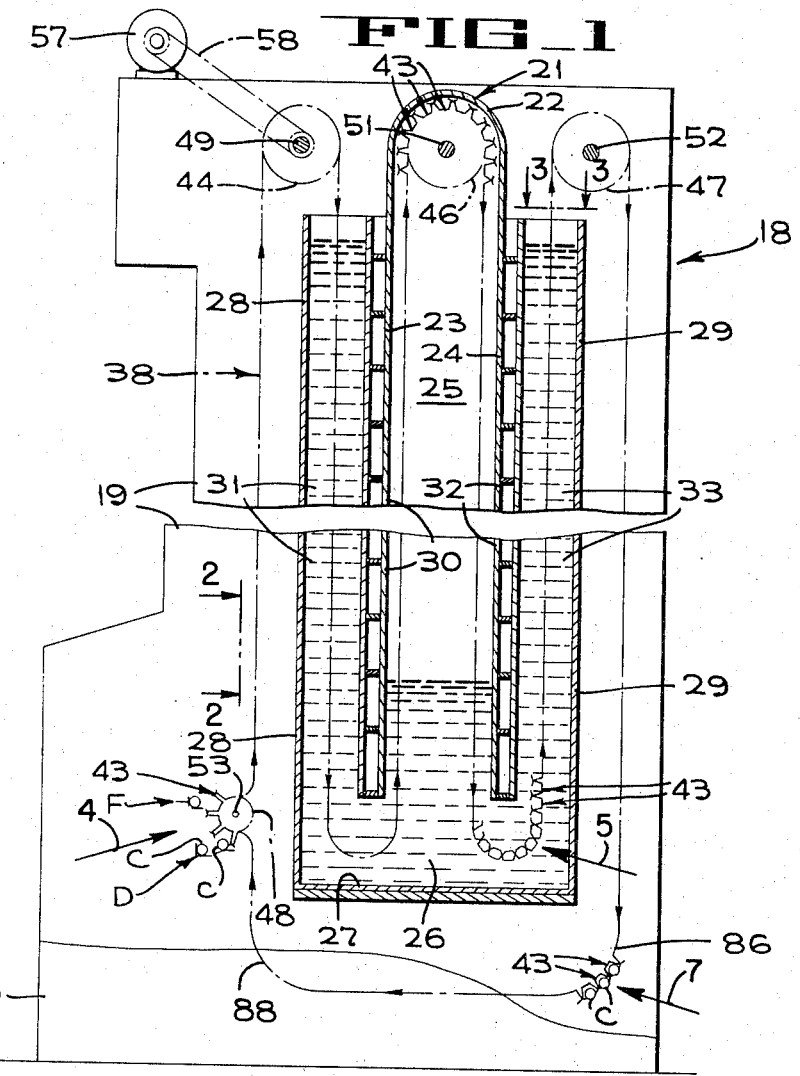
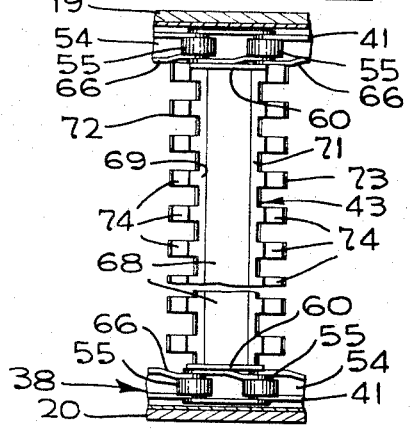
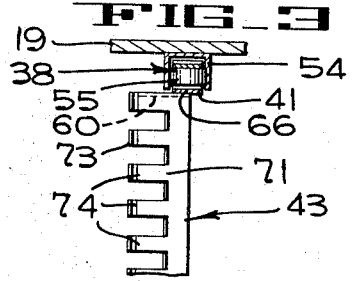
INVENTORS
SAMUEL A. MENCACCI
JOHN G. HAGERBORG
BY
ATTORNEY

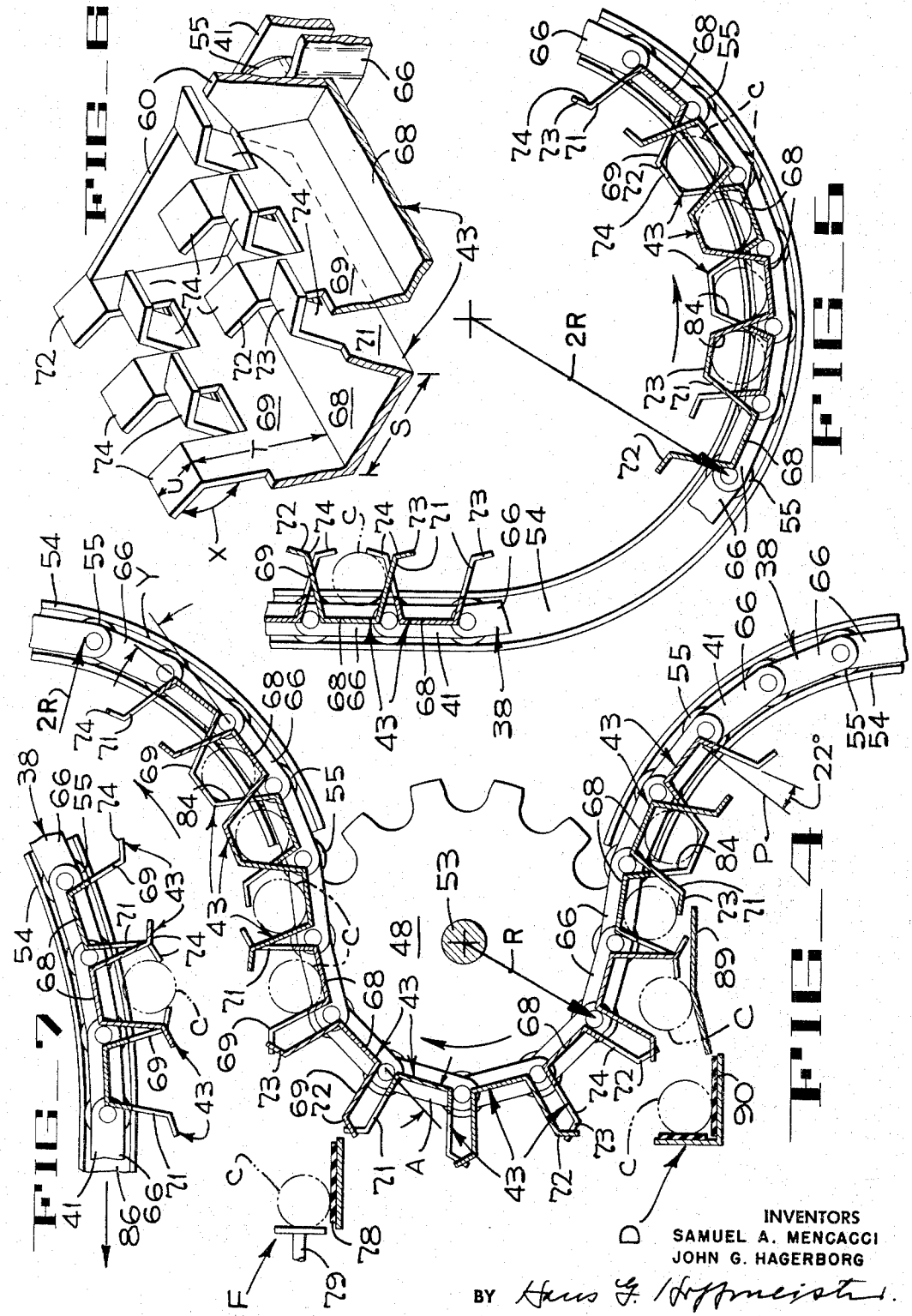

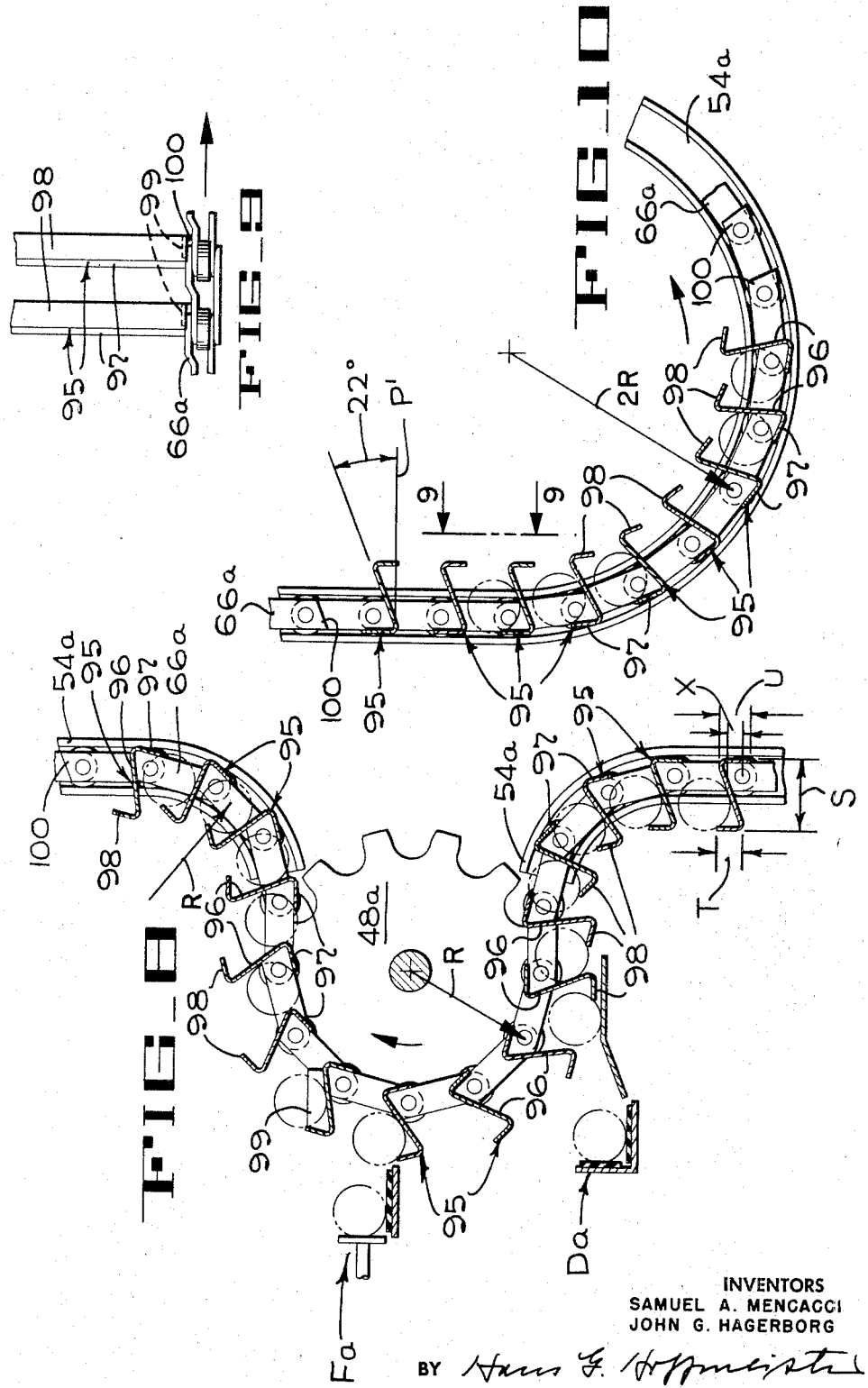

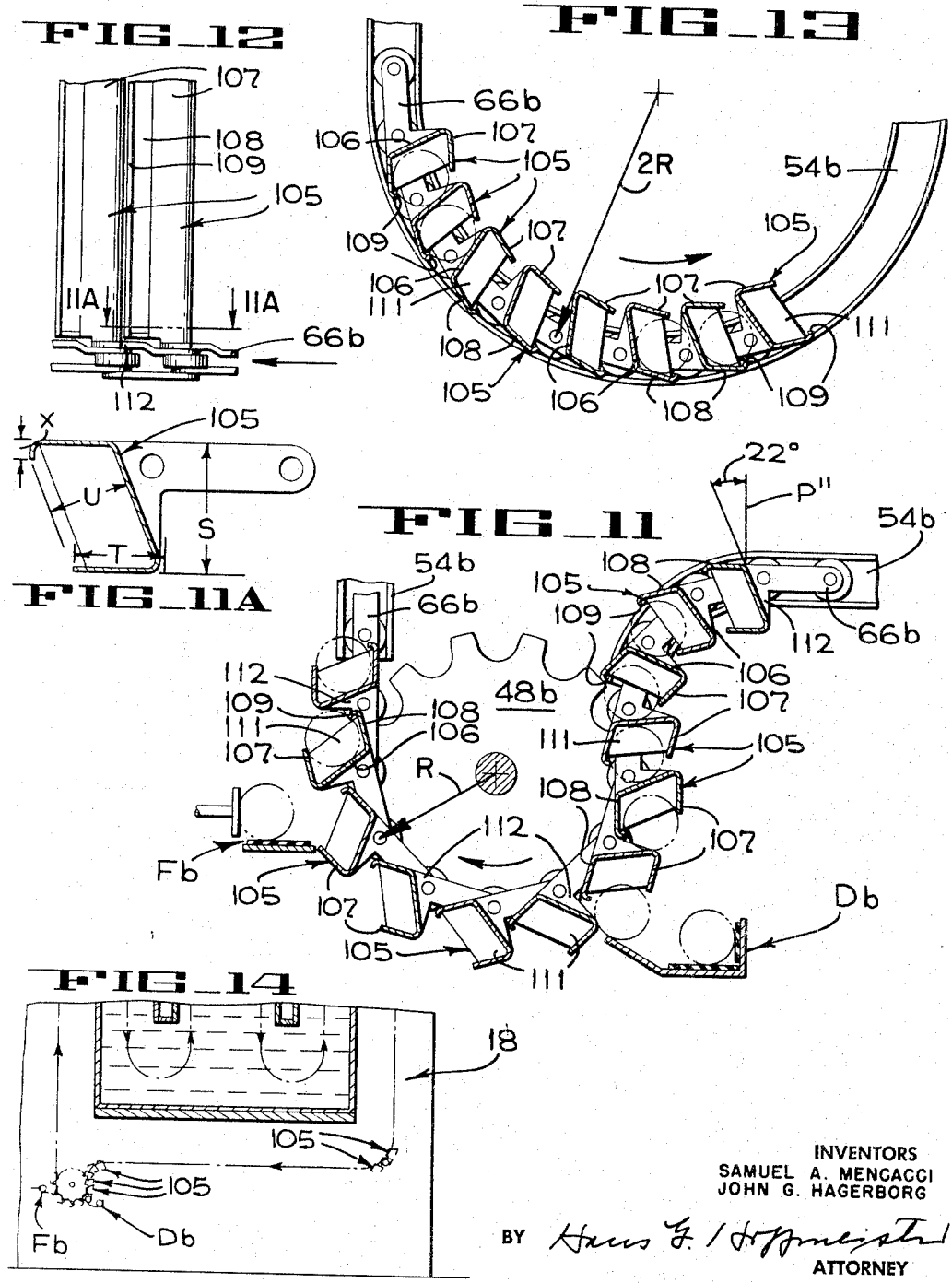

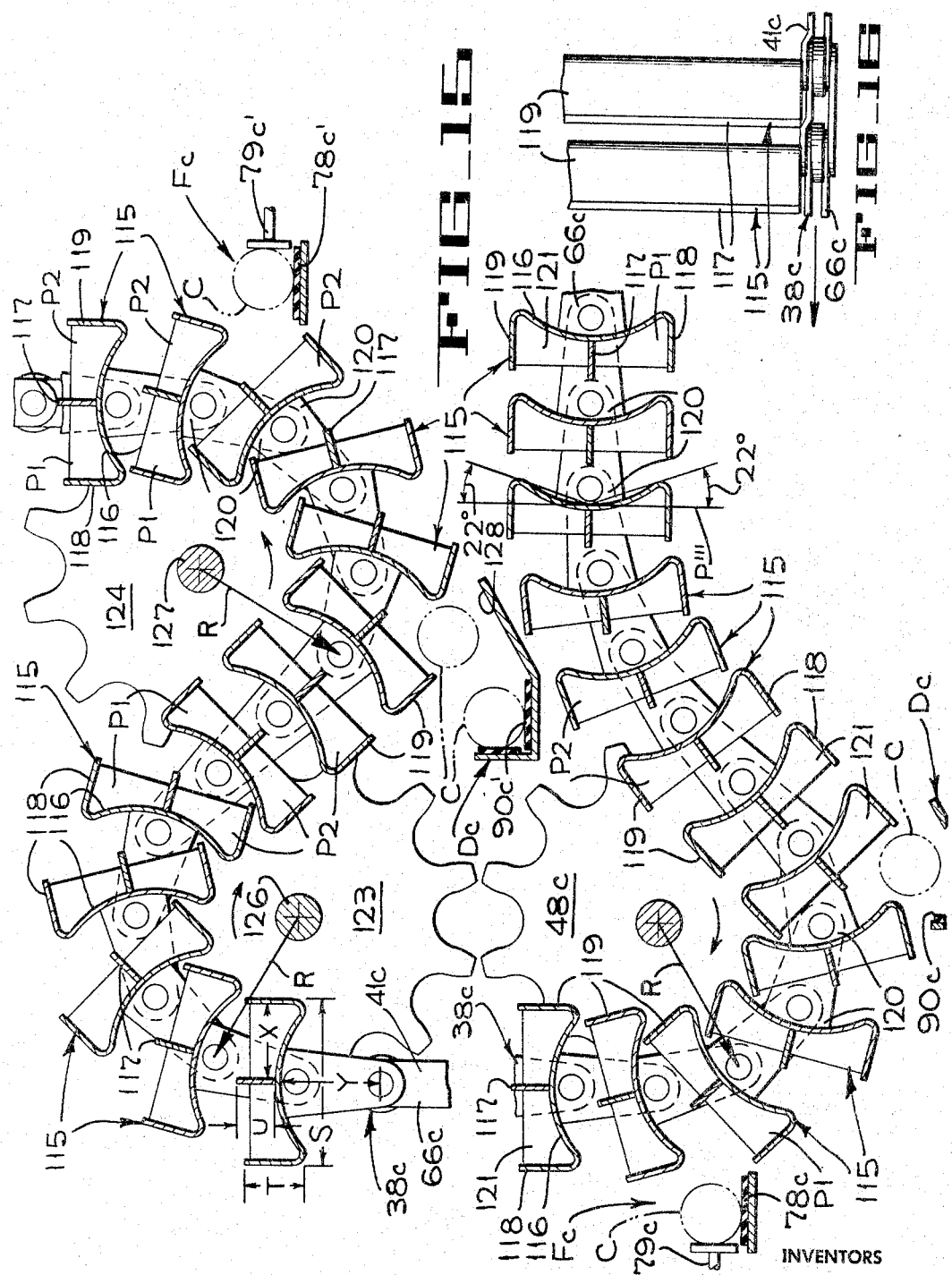

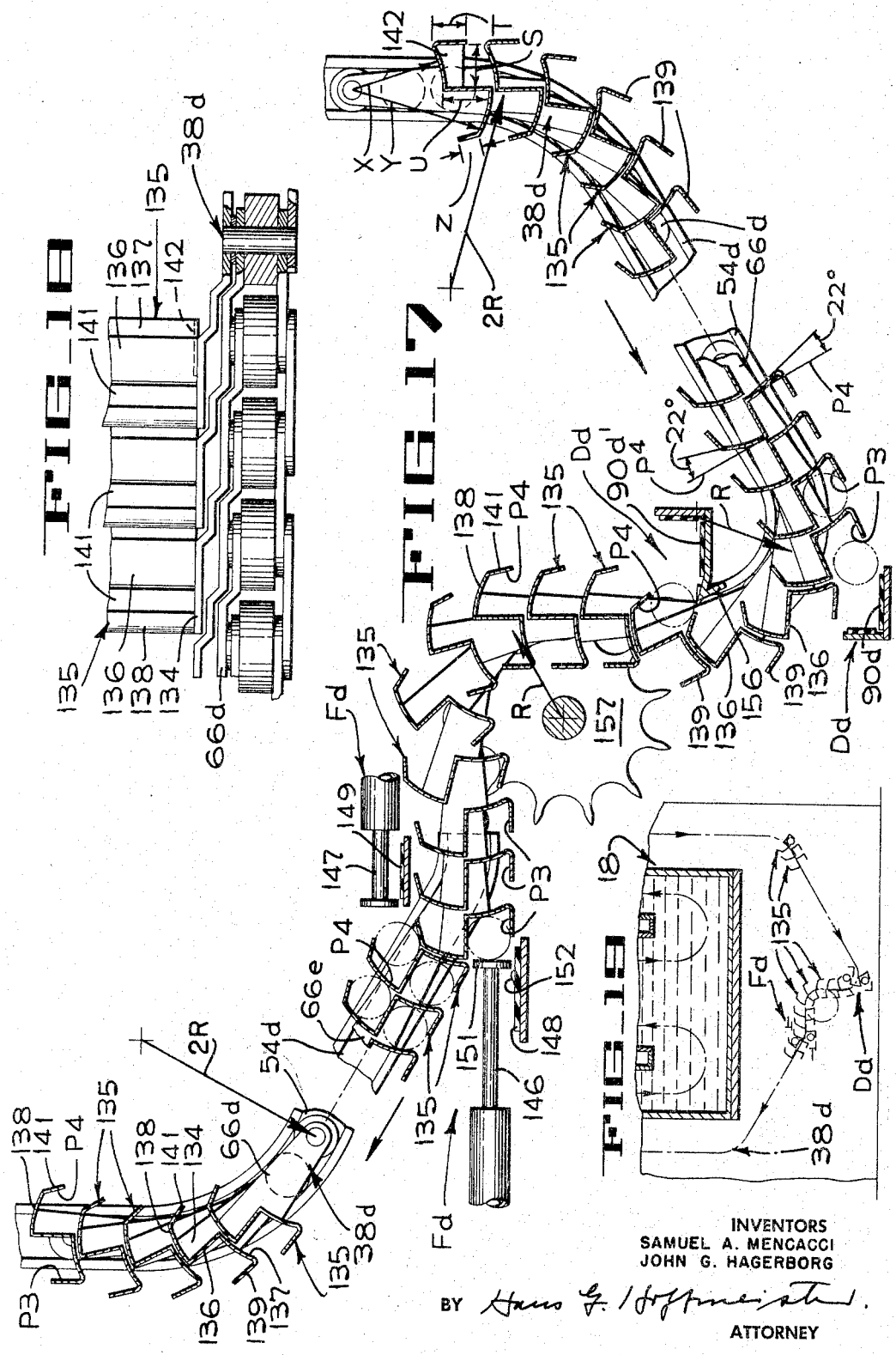

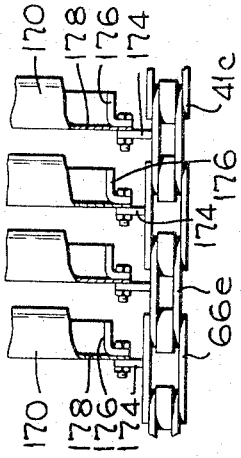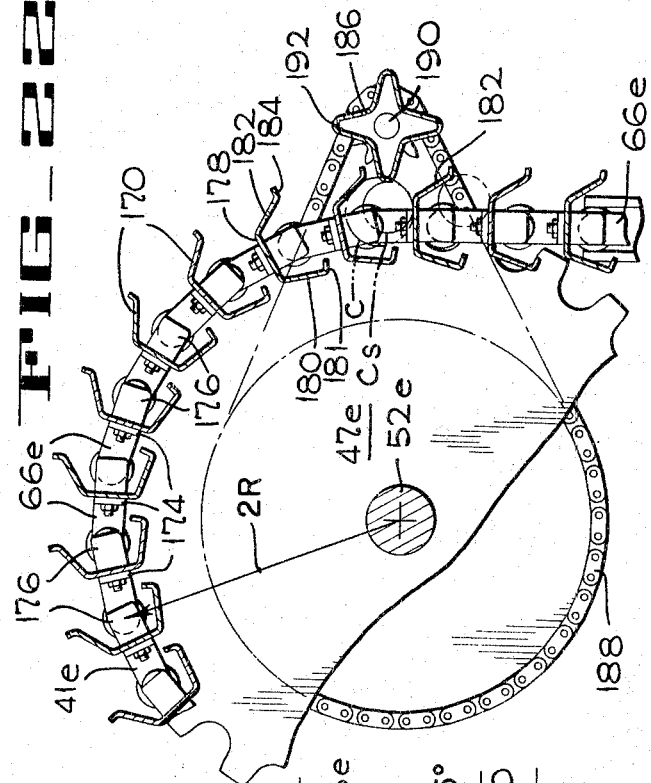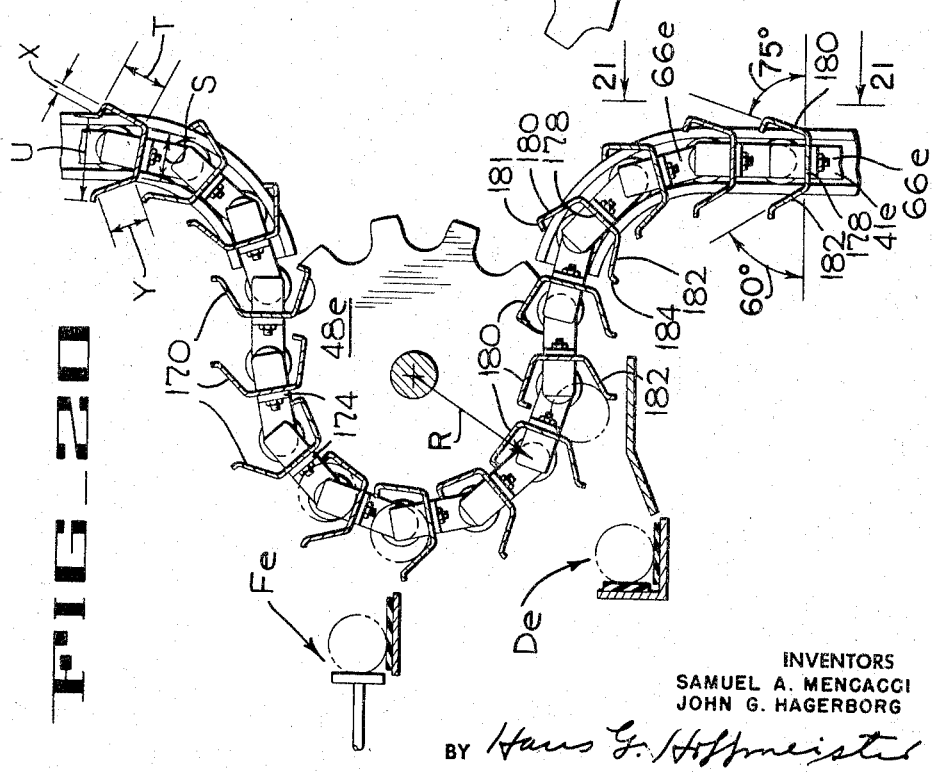

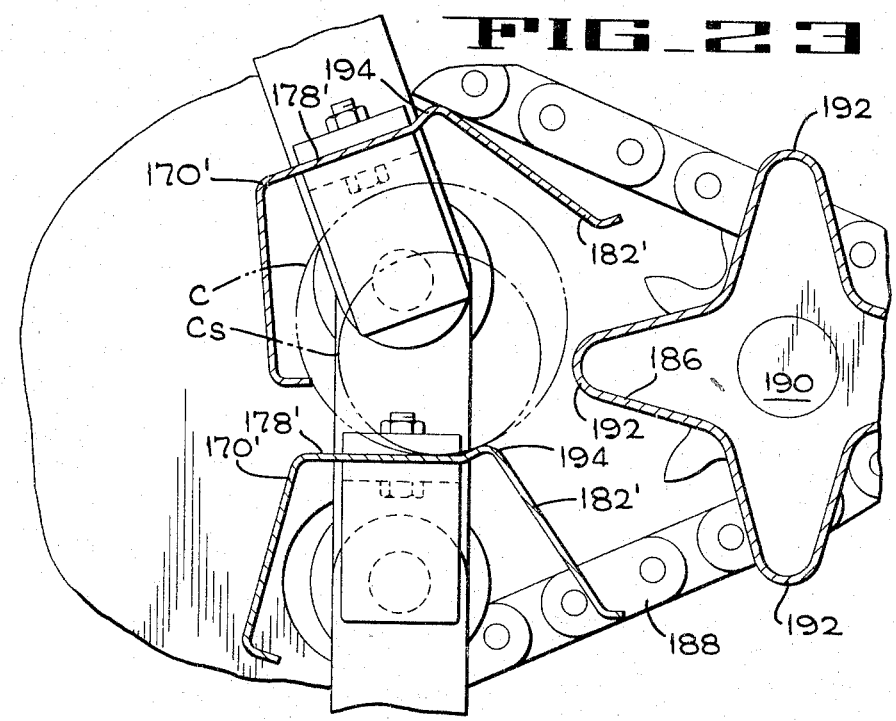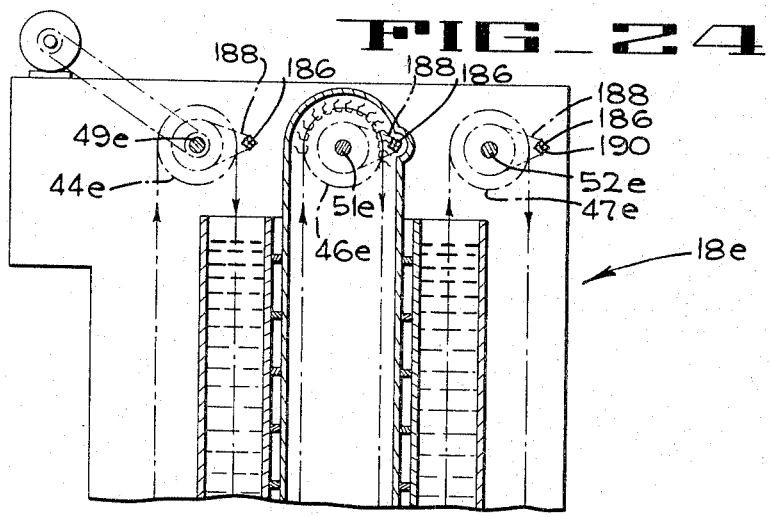

United States Patent Office 3,347,351
Patented Oct. 17, 1967

3,347,351
HYDROSTATIC COOKER BARS
Samuel A. Mencacci, Wilrijk, and John G. Hagerborg, Saint-Nicolas, Waas, Belgium, assignors to International Machinery Corporation, Saint-Nicolas, Waas, Belgium, a corporation of Belgium
Filed Aug. 20, 1964, Ser. No. 390,880
Claims priority, application Belgium, June 3, 1964, 648,757
3 Claims. (Cl. 198—131)

This invention pertains to cookers and more particularly is related to improved carriers for handling either glass containers or cans in hydrostatic cookers or the like.

When handling glass containers in cookers or sterilizers, such as hydrostatic cookers, special attention must be given to the gentle handling of the glass containers so as to minimize breakage, which breakage occurs in defective containers and is primarily due to thermal shock aggravated by impact caused when the containers change position in the supporting carriers.

Even though the carriers are designed so as to minimize impact, there will always be a certain amount of container breakage due to undetected defects in the glass. It will be appreciated that it is highly desirable to retain any broken glass in the carriers to prevent the glass from falling to the floor of the cooker. If the broken containers are discharged within the cooking chambers, the chambers, which may include water legs seventy feet tall, must periodically be drained so that the broken glass can be removed therefrom. This is not only inconvenient but is also quite expensive.

The carriers must also be arranged to positively confine the containers, either glass jars or cans, when the containers are being moved through the processing chambers to prevent the container from being discharged from the carriers by flotation or by gravity. Also, the carriers must be adapted to rapidly open to receive or discharge the containers when the carriers are moved past a feed or discharge station.

It is therefore one object of the present invention to provide carrier bars for confining glass containers and particles of broken glass therein during travel through the cooking chambers of the cooker, and to discharge the containers and any broken pieces of glass externally of the cooking chambers.

Another object is to provide carriers having their point of connection with the links of supporting chain conveyors spaced outwardly of the pivot points of the links so as to effect an accelerated deflection or opening of the carriers when moving around sharp outside bends.

Another object is to provide a means for mounting a carrier so as to effect a rapid deflection of a carrier to open a pocket therein when the carrier is moving around a curve.

Another object is to provide a generally S-shaped carrier for glass or metal containers.

Another object is to provide a generally C-shaped carrier for glass or metal containers.

Another object is to provide a double pocketed carrier adapted to handle a double row of containers, and being mounted on a processing conveyor in such a manner as to effect opening of the pockets for receiving and discharging the containers when the chain is deflected 30° and to prevent opening of the pockets sufficiently for the containers to pass therebetween when the chain is deflected through an angle of 15°.

Another object is to provide a double pocketed carrier adapted to load and discharge containers from both pockets when the carrier is deflected 30° in one direction from the next adjacent carrier.

Another object is to provide a star wheel driven in timed relation with a carrier to prevent container from gravitating from the carrier.

Another object is to provide a ridge on a carrier base wall to prevent containers from gravitating therefrom.

These and other objects and advantages of the present invention will become apparent from the following description and the accompanying drawings, in which:

FIGURE 1 is a fragmentary diagrammatic vertical section of a hydrostatic cooker employing one form of the article carrier of the present invention.

FIGURE 2 is an enlarged horizontal section taken along lines 2—2 of FIG. 1 showing only one of the carriers in plan, the central portion of the carrier being broken away.

FIGURE 3 is an enlarged fragmentary horizontal section taken along lines 3—3 of FIG. 1 showing one end of a single carrier, and the cam track for guiding the carrier through the hydrostatic cooker.

FIGURE 4 is an enlarged vertical section illustrating the position assumed by the carriers at the feed and discharge stations located in the section of the cooker indicated by arrow 4 in FIG. 1.

FIGURE 5 is an enlarged fragmentary vertical central section illustrating the positions of the carriers as they move around a lower inside curved path in the hydrostatic cooker, as at the section indicated by arrow 5 in FIG. 1.

FIGURE 6 is an enlarged perspective of a portion of a carrier showing the position of cooperating carrier bars when the carriers are moving along a linear horizontal path.

FIGURE 7 is an enlarged vertical central section illustrating the position of the carriers as the carriers move around a lower outside curved path positioned externally of the processing chambers of the hydrostatic cooker, such as that indicated by arrow 7 in FIG. 1.

FIGURE 8 is an enlarged vertical central section taken through the feed and discharge station of the hydrostatic cooker shown associated with S-shaped carriers of a second embodiment of the present invention.

FIGURE 9 is an enlarged vertical elevation showing the manner of mounting the S-shaped carriers of FIGURE 8 on one of the chains of a processing conveyor of a cooker, the view being taken looking in the direction of arrows 9—9 of FIG. 10.

FIGURE 10 is an enlarged vertical section showing the S-shaped carriers of FIG. 8 in a position confining the containers therein as the carriers are moved around an inside curve in the lower portion of a hydrostatic cooker.

FIGURE 11 is an enlarged vertical central section taken through the feed and discharge station of the hydrostatic cooker showing C-shaped carriers of a third embodiment of the present invention.

FIGURE 11A is an enlarged vertical section of one end of a C-shaped carrier taken along lines 11A—11A of 12.

FIGURE 12 is an enlarged vertical elevation showing the manner of mounting the C-shaped carriers of FIG. 11 to one of the chains of a progressing conveyor.

FIGURE 13 is an enlarged vertical section showing the C-shaped carriers confining the containers therein as the carriers more around an inside curve in the lower portion of a hydrostatic cooker.

FIGURE 14 is a fragmentary diagrammatic vertical section of the lower portion of a hydrostatic cooker illustrating the location of the feed and discharge stations of FIG. 11 in relation to other portions of the hydrostatic cookers.

FIGURE 15 is an enlarged vertical central section taken through the feed and discharge station of a hydrostatic cooker showing E-shaped carriers of a fourth embodiment of the present invention, certain parts being broken away.

FIGURE 16 is an enlarged plan showing the manner of mounting the E-shaped carriers of FIG. 15 to one of the chains of the processing conveyor.

FIGURE 17 is an enlarged vertical central section taken through the feed and discharge station of the hydrostatic cooker showing S-shaped carriers of a fifth embodiment of the present invention, certain parts being broken away.

FIGURE 18 is an enlarged plan showing the manner of mounting the S-shaped carriers of FIG. 17 to one of the chains of the processing conveyor.

FIGURE 19 is a fragmentary vertical section of the lower portion of the hydrostatic cooker illustrating the feed and discharge position of FIG. 17 in relation to other portions of the hydrostatic cooker.

FIGURE 20 is an enlarged vertical central section taken through the feed and discharge station of the hydrostatic cooker shown associated with generally U-shaped carriers of another embodiment of the present invention.

FIGURE 21 is a vertical elevation showing the manner of mounting the carriers of FIGURE 20 on one of the chains of a processing conveyor, the view being taken looking in the direction of arrows 21—21 of FIG. 20.

FIGURE 22 is a vertical section showing the carriers of FIGURE 20 moving around one of the sprockets in the upper portion of the hydrostatic cooker.

FIGURE 23 is an enlarged vertical section of a modified form of the U-shaped carrier showing the carrier moving around one of the sprockets in the upper portion of the hydrostatic cooker.

FIGURE 24 is a vertical central section through the upper portion of a hydrostatic cooker showing the position of the star wheels in relation to the sprockets in the upper portion of the hydrostatic cooker.

The several forms of the carrier or carrier bars of the present invention are shown associated with a hydrostatic cooker 18 (FIG. 1) of the standard well-known design such as that disclosed in United States Patent 3,031,065 to John F. French dated Apr. 24, 1962. The hydrostatic cooker 18 comprises, in general, a pair of spaced vertically extending side walls 19 and 20 suitably supported in an upright position. A housing 21, which extends between walls 19 and 20, has a rounded upper end 22 and two depending walls 23 and 24 which cooperate with walls 19 and 20 to define a cooking chamber 25 which is filled by means of conduits (not shown) with steam at a predetermined cooking pressure and temperature, for example, at 275° F. and 30 p.s.i. gauge. The lower end of the housing 21 opens into a water filled trough 26 which is formed by the side walls 19 and 20, a transverse horizontal plate 27, and the lower end portions of two transverse vertical walls 28 and 29. The wall 28 cooperates with another transverse vertical wall 30 to define an inlet hydrostatic water leg 31, and the wall 29 cooperates with a transverse vertical wall 32 to provide an outlet hydrostatic water leg 33. The hydrostatic legs 31 and 33 communicate with trough 26 and are filled with water so as to create sufficient pressure to resist the pressure of steam in the cooking chamber 25. The inlet hydrostatic water leg 31 is thermostatically controlled to provide a gradually increasing water temperature from approximately 210° F. at its upper end to approximately 275° F. at its lower end. The outlet water leg 33 is also thermostatically controlled to provide a gradual decrease of water temperature from approximately 275° F. at its lower end to any suitable temperature below the boiling point of water at atmospheric pressure, depending upon the type of containers being handled, at the upper end thereof. Steam is added to the water in the hydrostatic inlet leg 31 to provide the desired temperatures therein, and cold water is directed into the outlet or cooling leg 33 to provide the desired cooling temperature therein.

Rows of containers to be processed are carried through the cooker by an endless conveyor 38. The conveyor 38 comprises a pair of endless chains 41 (FIG. 2) having a plurality of elongated spaced carriers or carrier bars 43 of the first embodiment of the invention mounted therebetween. The chains 41 are trained around transversely aligned pairs of sprockets 44, 46, 47 and 48 (only one sprocket of each pair being shown in FIG. 1) which are keyed to shafts 49, 51, 52 and 53 respectively, that are suitably journaled in the side walls 19 and 20. The chains 41 are guided along tortuous paths by channel tracks 54 (FIGS. 2 and 3) which tracks are secured to the frame of the cooker and are arranged to receive rollers 55 carried by the chains. A variable-speed motor 57 (FIG. 1) is connected to the shaft 49 by a chain drive 58 which drives the conveyor 38 continuously in the direction of the arrows indicated on the pitch line, shown in FIG. 1, of the path of travel of the conveyor. If desired the shafts 51 and 52 may also be driven by chain 58.

The carriers 43 (FIGS. 1 to 6) of the first embodiment of the present invention are especially adapted to handle rows of glass containers C since they are designed to gently handle the containers. Also, the carriers 43 are designed to confine any containers which break during processing within the associating carriers until such time as the carriers move out of the processing chambers of the hydrostatic cooker and are advanced around outside curves wherein broken pieces of glass, as well as containers which are intact, are discharged from the carriers.

Each carrier 43 has a pair of end plates 60 and is mounted between the chains 41 (FIG. 2) as by welding or bolting each end plate 60 of the carrier to a curved link 66 of the chain. The end plates 60 are omitted from FIGS. 1, 4, 5 and 7. Each carrier has a base wall 68 from which a pair of side walls 69 and 71 project outwardly at an angle which is obtuse relative to the base and is approximately 22° relative to a plane P (FIG. 4) that is the longitudinal centerline of link 66. Outwardly directed flanges 72 and 73 are formed on the outer ends of each side wall 69 and 71, respectively, to provide rigidity to the side walls. As clearly illustrated in FIGS. 2, 3 and 6, the side walls and flanges are slotted to form fingers 74 which intermesh with similar fingers on the next adjacent carriers. As best seen in FIG. 4, at certain sections of the cooker, each carrier is closed due to the fact that the fingers 74 of the carriers on each side thereof extend across and close the normally open end of the carrier.

As diagrammatically illustrated in FIG. 4, a row of containers C is pushed laterally off a feed conveyor 78 at a feed station F by a pusher 79 which is operated in timed relation with the movement of the conveyor 38. The feed conveyor and pusher may be of any well known type such as that disclosed in the aforementioned John F. French patent. When at the feed station F, each carrier bar 43 is completely open, and one side wall 69 is sloping downwardly to act as a chute to gently guide the row of containers toward the wall 68 of the carrier, which wall 68 is angled relative to the direction of movement of the containers so as to minimize impact of the containers. In order to provide complete opening of the carriers at the feed station F, the radius R of sprocket 48 and the pitch of the conveyor 38 are designed to impart an angle of deflection A of 30° between each adjacent pair of chain links 66 as the conveyor 38 moves around the sprocket 48. In one effective arrangement, the radius R was approximately 14 inches and the pitch of the conveyor was approximately 7 inches. The base S (FIG. 6) of the carrier was approximately 5.35 inches, the height T was about 5.8 inches, the dimension U was approximately 2 inches, and angle X was about 120 degrees when a container 4.6 inches in diameter was processed.

After a row of containers has been fed into each carrier at the feed station F, the channel tracks 54 immediately guide the conveyor 38 through an inside bend having a radius 2R, which is twice as large as radius R.

This inside bend causes each link to move to a position at an angle Y (FIG. 4) which is 15° from the adjacent link, thereby completely confining the containers within carrier pockets 84 defined by cooperating parts of three adjacent carrier bars 43. Continued movement of the conveyor in the direction of the arrow in FIG. 4 will advance the carrier bars 43 along a linear path and upwardly around sprockets 44 (FIG. 1) causing the pockets 84 to be partially opened. It will be noted however, that gravity will hold the containers in the partially opened pockets. The radius of each of the sprockets 44, 46 and 47 is preferably twice that of the sprockets 48 at the feed station F.

When moving vertically through the several processing chambers of the cooker, the carrier bars 43 assume a partially open position as illustrated in FIGS. 5 and 6 thereby permitting excellent contact of the processing medium, steam or hot water, with the containers being treated. It will be noted that, although the carriers 43 are partially open during their travel along the vertical linear paths, the configuration of the carrier bars 43 places the opening between opposed fingers 74 at a height, relative to the containers therein, that will not permit broken pieces of glass of appreciable size to be discharged from the pockets 84. Of course, the opening is not of a sufficient size to permit passage of whole containers therethrough.

At the lower end of each vertical run within the processing chamber of the hydrostatic cooker 18, the cam tracks 54 cause the carriers 43 to move around an inside curve having a radius 2R (FIG. 5) which is preferably at least twice the radius of sprockets 48. When moving around inside curves of this radius, the carrier pockets 84 are substantially closed as illustrated in FIG. 5 thereby preventing any partially filled containers from floating out of its associated carrier pocket 84. Also, it will be apparent that pieces of broken glass will be confined in the carrier pockets as the carriers move around these curves.

After the carriers, with the containers as well as any pieces of broken glass confined therein, moves out of the discharge water leg 33 (FIG. 1) and around sprockets 47, they move downwardly externally of the processing chambers of the hydrostatic cooker to a pair of outside curves 86 and 88 defined by the channel tracks 54 having a radius of approximately four times the radius of the sprockets 48. As shown in FIG. 7, the pockets 84 defined by the carriers 43 do not open sufficiently while moving around the outside curves 86 or 88 to permit the containers to be discharged therefrom. However, the carriers do open sufficiently to discharge pieces of glass from the pockets, which pieces of glass may be removed from the hydrostatic cooker by any suitable means such as by a conveyor or the like.

The carriers are then advanced to the discharge station D (FIG. 4) where the pockets 84 are opened upon being advanced around the sprockets 48 having radius R. As the pockets 84 open, the containers C, as well as any large pieces of broken glass remaining in the carriers, are pushed along a chute 89 onto a discharge conveyor 90 of any suitable well known type, such as a continuously driven endless belt conveyor, which advances the processed containers and large pieces of broken glass away from the hydrostatic cooker.

As mentioned above, the carriers 43 are especially adapted to handle glass containers since broken pieces of glass remain within the carriers until the carriers are moved out of the processing chambers of the hydrostatic cooker. It will be apparent however, that the carriers 43 can handle cans or other similar articles as easily as they can handle glass containers.

It will be understood that glass containers broken in the carriers do not generally shatter into small pieces but remain in pieces too large to pass through the slots between the fingers 74. If it is desired to retain very small pieces of glass in the carriers, it is apparent that the width of the slots and fingers 74 can be reduced so as to confine such pieces.

The S-shaped carrier bars 95 (FIGS. 8, 9 and 10) of the second embodiment of the present invention are designed to handle glass or metal containers equally as well and may be substituted in the hydrostatic cooker 18 for the carriers of the first embodiment of the invention. Such substitution requires only minor alterations to the chain links 66 disclosed in the first embodiment of the invention and requires no alterations to other portions of the hydrostatic cooker 18. Accordingly, parts of the second embodiment of the invention which are identical to those of the first embodiment will be assigned the same reference numerals followed by the letter "a."

It will be appreciated that, when the S-shaped carriers 95 are utilized to handle glass containers, only the larger pieces of broken containers will be retained in the carriers 95 and be carried out of the processing chamber of the hydrostatic cooker for subsequent discharge with the processed containers at the discharge station D.

Each of the S-shaped carriers 95 comprises an inclined central wall 96 having parallel inner and outer flanges 97 and 98 formed on opposite edges thereof. The carriers 95 are provided with suitable end plates 99 (shown only on FIG. 9 and in the central portion of FIG. 8) to prevent containers from sliding out of the ends thereof.

In order to insure positive confinement of the containers within the carriers 95 as the carriers are moving around inside curves disposed within the cooker and having radii of 2R, and to readily release the containers when moving around an outside curve having radius R which is half as large as radius 2R, it has been found necessary to form an extension 100 on the forward end of each link 66a at a point ahead of the leading pivot point of the forward links 66a rather than between the pivot points as is the usual manner. It has also been discovered that in order to accommodate maximum size containers, the central wall 96 of the carrier 95 should be located in a plane that is disposed at an angle of about 22° from a plane P' (FIG. 10) which is perpendicular to the center line of the associated supporting links, and that the flanges 97 and 98 should be parallel to the center line of the supporting links. The container size illustrated in FIGS. 8 and 10 is the largest that can be accommodated in the particular S-shaped carriers when the channel tracks 54a are designed to cause the carriers to move around an inside curve of radius R as illustrated in FIG. 8. When handling the same size containers as disclosed in the first embodiment of the invention, the radius R may be approximately 10 inches and the pitch of the chains may be approximately 5 inches. The carrier may have a height S of 5.82 inches, a dimension T of 2 inches, a dimension U of 2.6 inches, and a dimension X of 1.3 inches. It is preferable, however, to provide all inside curves with curves with radii of 2R or greater as illustrated in FIG. 1.

It is to be understood that by utilizing inside curves no smaller than 2R and by extending the width of the flanges 97 and 98, the S-shaped carriers 95 can be adapted to handle a relatively large range of container sizes. It will also be apparent that when mounting the S-shaped carriers outwardly of the pivot points of the associated chain links 66a on the extensions 100 as illustrated, the outer flanges 98 of the carriers will open wider when moving around sprockets 48a than would occur if the carriers were mounted between the pivot points of the link. Thus, mounting the carriers 95 to the associated links 66a in the above described manner provides for easier feeding of containers into the carriers 95 at feed station Fa, and after passage of the carriers through the cooker 18, provides for an easier discharge of processed containers from the carriers at discharge station Da.

The third embodiment of the present invention comprises a C-shaped carrier 105 (FIGS. 11–14). The C-shaped carriers 105 may be used to replace the carriers disclosed in either the first or second embodiments of the invention and may be moved through the hydrostatic cooker 18 as described in connection with the first embodiment of the invention. The containers may be fed into or discharged from the carriers 105 when a conveyor is used that has the feed station and discharge station located as shown in FIG. 1, or when a conveyor arrangement having curved portions defining the feed station F$b$ and the discharge station D$b$.

The C-shaped carriers 105 comprise a central wall 106 having an outer flange 107 and an inner flange 108 formed integrally therewith. A curved lip 109 is provided on the free end of the inner flange 108 of each carrier to aid in retaining either glass or metal containers therein when the carriers are guided around an inner curve of radius 2R by the channel cam tracks 54$b$ as illustrated in FIG. 13. End plates 111 are secured to each end of the carriers to prevent containers from being discharged therefrom.

It will be noted that the central wall 106 of each C-shaped carrier is mounted on extensions 112 of the associated links 66$b$ in a manner quite similar to that of the S-shaped carriers of FIGS. 8–10. The central wall 106 is mounted at an angle of about 22° from a plane P″ that is perpendicular to the longitudinal center line of the supporting links 66$b$, as illustrated in FIG. 11, and is mounted forwardly of the forward pivot point of the supporting links. Mounting of the carriers in this way effects a wider opening between adjacent carriers when the carriers 105 moved around the sprockets 48$b$ having radius R adjacent the feed station F$b$ and the discharge station D$b$ than would occur if the carriers were mounted between the pivot points of the links. The radius R in the embodiment of the invention may be approximately 5¾ inches when the chain pitch was 2⅞ inches and the container being processed was 2⅜ inches in diameter. The carrier had a dimension S of 2⅞ inches, a dimension T of about 2 inches, a dimension U of 1¾ inches, and a dimension X of about ⅜ of an inch. This manner of mounting the carriers will also assure complete confinement of the containers when the containers move around inside curves having a radius of 2R as illustrated in FIG. 13.

The fourth embodiment of the present invention comprises E-shaped carrier bars 115 (FIGS. 15 and 16), each bar defining two pockets P1 and P2 thereby adapting each carrier to simultaneously handle two rows of glass or metal containers.

Each carrier 115 comprises a curved base wall 116 having a central flange 117 secured thereto and projecting radially outward therefrom, and side flanges 118 and 119 connected to opposite ends of the curved wall 116 and positioned parallel to the central flange 117. End plates 121 are secured to the opposite ends of each carrier to prevent containers from being discharged therefrom.

The curved wall 116 is secured to widened forward end portions 120 of the associated links 66$c$ of the chains 41$c$ at a position forwardly of the two pivot points of the associated links, rather than between the pivot points. The curvature of the wall 116 of each carrier is formed by striking an arc having its center concentric with the furthest pivot axis of those links which support the carrier. It will also be noted that lines drawn between the point of attachment of the central flange with the curved wall 116 and the points of attachment of the side flanges 118 and 119 with the wall 116 will be in a plane that is at an angle of about 22 degrees from a plane P‴ drawn perpendicular to the longitudinal center line of the particular links 66$c$ on which the carrier is mounted.

Accordingly, the E-shaped carriers are similar to the C-shaped carriers of FIGS. 11–13 but include two symmetrical carrier pockets P1 and P2 for each link rather than only one carrier pocket per link. The E-shaped carriers 115 will confine containers therein when moving in either direction around curves having radii of 2R, and will discharge containers from the pockets on the outside of the curve when moving around curves having radii R. The radius R may be approximately 7¼ inches when handling containers of approximately 2¾ inches. The carrier may have a dimension S of 7¼ inches (FIG. 15), a dimension T of 2⅝ inches, a dimension U of 1¾ inches, a dimension X of 4½ inches, and a dimension Y of 4⅝ inches. Thus, portions of the hydrostatic cooker may be the same as that disclosed in FIG. 1 except for the location of the feed and discharge station.

As illustrated in FIG. 15, containers C are fed into each outer carrier pocket P1 by a pusher 79$c$ which pushes a row of containers from the feed conveyor 78$c$ at the outside feed station F$c$ when the conveyor 38$c$ is moving around sprockets 48$c$ of radius R. After these containers have gone through the cooker, they are discharged from the outer pockets P1 onto discharge conveyor 90$c$ at the outside discharge station D$c$ as the conveyor 38$c$ moves around the lower portion of the sprockets 48$c$.

In order to feed containers into and discharge containers from the inside pockets P2 of the carriers 115, the conveyor 38$c$ is trained around two pairs of sprockets 123 and 124 which have a radii R and are mounted on shafts 126 and 127, respectively. As the carriers move around sprockets 124, the inside pockets P2 open thereby discharging processed containers onto a chute 128 which advances the containers onto a discharge conveyor 90$c'$ at the inside discharge station D$c$ for discharge from the hydrostatic cooker in the usual manner. Containers to be processed are pushed off a feed conveyor 78$c'$ at the inside feed station F$c$ into an open pocket P2 by a pusher 79$c'$ which is actuated in timed relation with the movement of the conveyor 38$c$ in any well known manner.

Although the sprockets 48$c$, 123 and 124 are illustrated as being relatively close together, it will be appreciated that the location of the three pairs of sprockets may be varied considerably from that shown in the drawings. For example, the sprockets 48$c$ could be eliminated if it was desirable to discharge containers from the outside pockets P2 when moving round the curve 86 (FIG. 1). All that would be required would be that the conveyor at the discharge point be deflected through a radius R either by appropriate sprockets or cam tracks.

The fifth embodiment of the present invention discloses double carriers 135 (FIGS. 17, 18 and 19) of S-shaped configuration, each carrier 135 cooperating with other carriers to define pockets P3 and P4.

Each of the double pocketed, S-shaped carriers 135 comprises a central wall 136 which, as seen at the left side of FIG. 17, is secured to extensions 134 of the associated links 66$d$ and is parallel to the longitudinal axes thereof. A first curved wall 137 is secured to one edge of the central wall 136 and projects outwardly from one side of the central wall, and a second curved wall 138 is secured to the other edge of the central wall and projects outwardly from the other side thereof. A retaining flange or wall 139 is secured to the outer edge of the first curved wall 137 and is parallel to the central wall 136, and a similar flange 141 is secured to the outer edge of the second curved wall 138. The flange 141 is angled relative to the central wall 136 so as to aid in feeding containers into and discharging containers from pockets P4. End plates 142 (only one being shown in FIG. 17) are provided at each end of each carrier to prevent discharge of containers therefrom.

It will be noted that the curvature of the first and second walls 137 and 138 are the same, and that the curvature of each wall is generated by an arc having its center disposed on the second downstream pivot axis of the chain links which support the particular carrier.

It will also be noted that the extensions 134 of each link project a considerable distance forward of the two pivot points of the associated links 66$d$, and that the carrier 135 is mounted on these extensions a considerable distance forward of the two pivot points of the supporting links.

As shown in FIG. 17, lines drawn between the outer edges of the curved walls 137 and 138 and the points of connection of the curved walls 137 and 138 with the central walls 136, define angles of about 22° with a plane P4 which is perpendicular to the longitudinal axis of the associated links 66d. Thus, the curved walls project outwardly from opposite sides of the longitudinal center line of supporting links at the above defined 22° angle.

In order to feed containers into or discharge containers from the S-shaped carriers 135, the carriers need not travel through a curve in excess of 180° as is required by the E-shaped carriers 115 of the fourth embodiment of the invention but must only be deflected 30° from the adjacent carrier when starting from a horizontal position for feeding, and approximately 45° for discharging containers from both pockets P3 and P4 starting from a position inclined 30° from the horizontal. Also, the feeding and discharging is accomplished from both pockets P3 and P4 from each carrier by deflecting the downstream carrier 30° in a counterclockwise direction (FIG. 17) relative to the next adjacent upstream conveyor.

As illustrated in FIGS. 17 and 19, rows of containers are simultaneously fed into the pockets P3 and P4 by pushers 146 and 147, which are similar to the pusher 79 of FIG. 4, from endless belt feed conveyors 148 and 149. The pushers may be operated in timed relation with the movement of the processing conveyor 38d in any suitable well known manner. It will be noted that the head 151 of the pusher 146 will aid in holding the containers in pockets P3 until the pockets are closed. A raised rib 152 is provided in the upper surface of the feed conveyor 148 to cooperate with the pusher head 151, when the pusher is in a retracted position, to define a channel to guide a row of containers C into position to be deflected into the next approaching carrier pocket P3

After the containers in pockets P3 have been processed, the containers are discharged from pockets P3 onto a discharge conveyor 90d as the carriers are guided around a curve defined by the channel cam tracks 54d and having a radius R. If it is desired to handle containers approximately 2 inches in diameter, the radius R may be approximately 4½ inches and the pitch of the conveyor will be 2⅜ inches. For this size container, the S-shaped carrier may have a dimension S (FIG. 17) of 2¼ inches, a dimension T of 1½ inches, a dimension U of 2¼ inches, a dimension X of 4¼ inches, a dimension Y of 6½ inches and a dimension Z of ⅞ inch.

The containers in pockets P4 are discharged therefrom at the discharge station Dd onto a discharge conveyor 90d′ as the pockets approach a vertical position. A stationary curved guide 156 assures that the containers will remain in the pockets P4 until they are elevated to a position above that of the discharge conveyor 90d′

After the processed containers are discharged from the carrier pockets P3 and P4, the carriers are advanced around a pair of sprockets 157 to change the direction of movement of the carriers from a vertical to a horizontal position prior to return of the carriers to the feed station Fd. It will be appreciated that the carriers 135 will remain in closed container-confining positions when the carriers are moved around curves in either direction having a radii no less than 2R which corresponds to a deflection between links of no more than 15°.

The embodiment of the invention illustrated in FIGURES 20 to 24 discloses carriers 170 of generally U-shaped configuration. Since these carriers are movable through a hydrostatic cooker 18e that is quite similar to the cooker 18 (FIG. 1) associated with the first embodiment of the invention, parts which are similar to those in the first embodiment of the invention will be assigned the same numerals followed by the letter "e."

As shown in FIGS. 20, 21 and 22, chains 41e are each constructed with a plurality of interconnected links 66e having mounting flanges 174 projecting outwardly from their midpoints. Each end of each carrier 170 and an angle carrier stop 176 is bolted to a flange 174 thereby rigidly attaching the carriers to the chains 41e. Each carrier includes a base wall 178 which lies in a plane perpendicular to the longitudinal axis of the supporting links 66e. An inner side wall 180 having a flanged end 181 is secured to one edge of the base wall 178, and an outer side wall 182 also provided with a flange end 184 is secured to the other edge of the base wall 178.

In order to feed containers into the carriers 170 at the feed station Fe and discharge containers from the carriers at the discharge station De when moving around a sprocket 48e having radius R, the outer wall 182 defines an angle of approximately 60° (FIG. 20) with the plane of the base wall 178 thereby permitting the carriers to be placed close to each other and at the same time accommodate containers having a large diameter. The wall 180 defines an angle of approximately 75° with the base wall 178 so as to accommodate the large containers.

When it is desired to handle containers ranging in size from approximately three inches to four inches in diameter, the radius R (FIG. 20) may be approximately 8⅝ inches and the chain pitch may be approximately 4½ inches thereby causing the chain links to be deflected 30° from each other. If it is desired to handle containers varying in diameter from approximately three inches to approximately 4⅛ inches, the radius of the sprocket 48e may be approximately 7¼ inches causing each chain link to deflect approximately 36° from the next chain link. Each carrier 170 is adapted to handle containers of the above size range when the carrier has a dimension S of about 3¼ inches, a dimension T of about 3 inches, a dimension U of approximately 5⅛ inches, a dimension S of about ⅝ inch, and a dimension Y of about 2⅝ inches.

When the carriers 170 are going around the curves in the lower portion of the hydrostatic cooker, which curves have radii 2R, the containers will be positively confined therein in the manners described in connection with the other embodiments of the invention. However, when the carriers 170 are moving around the sprockets 44e, 46e and 47e (FIG. 24) in the upper end of the hydrostatic cooker 18e, the carriers will not close sufficiently to confine small containers Cs (FIGS. 22 and 23) therein as do the carriers of the other embodiments of the invention because of their special construction and manner of mounting.

In order to prevent small containers Cs from gravitating from the carriers 170 before the carriers are sufficiently closed, an elongated star wheel 186 is journalled adjacent the downward run of the carriers 170 as the carriers move downwardly past the sprockets 44e, 46e and 47e. Each star wheel 186 is driven in timed relation with the associated sprocket 44e or 47e by a chain drive 188 connected with shaft 49e, 51e, or 52e that supports the associated sprocket, and the shaft 190 which supports the star wheel 186. As shown in the FIGURES 22 and 23, each star wheel 186 is driven so that elongated teeth 192 of the star wheel 186 will project between the outer walls 182 of adjacent carriers 170 to block the feed and discharge openings of the carriers and prevent the small containers Cs from gravitating therefrom until such time as the carrier sprockets are sufficiently closed to prevent such discharge in response to the carriers being moved into a linear path from the curved path.

A modified carrier 170′ (FIG. 23) is substantially the same as the carrier 170 except that the carrier 170′ is provided with an elongated ridge 194 in its base wall 178′. The ridge 194 may be used in combination with a star wheel 186, or may be used alone, to prevent small containers Cs from gravitating from the carriers 170′ as they are moving downwardly around the upper sprockets.

It will be apparent from the foregoing description that several of the embodiments of the carrier bars of the present invention includes at least one wall that is disposed at an angle of approximately 22° from a line measured perpendicular to the longitudinal axis of those links which support the carrier. This angle has been found to be particularly advantageous in order to accommodate very large containers between carriers mounted on chains having a relatively short pitch and yet assure opening of the carrier pockets sufficiently to reliably receive and discharge containers therefrom when the carriers are deflected 30° from each other and to prevent discharge of containers therefrom when the carriers are deflected 15° from each other when moving around inside curves. The mounting of the carriers forwardly of the pivot points of the supporting links cooperates with the aforementioned angled wall to aid in the opening of the carriers when the carriers are deflected 15° from each other thereby assuring reliable feeding and discharging of containers therefrom.

Although all embodiments of the invention will handle glass containers and, in case of broken containers being encountered, will confine the larger pieces of broken containers, such as half containers therein, the embodiment of FIGS. 1–6 is ideally suited for handling glass containers since relatively small, as well as larger, pieces of broken glass are confined therein until the carriers are moved to a position externally of the processing chamber of the cooker.

While several embodiments of the present invention have been disclosed and described, it will be understood that various changes and modifications may be made without departing from the spirit of the invention or the scope of the appended claims.

The invention having thus been described, what is believed to be new and desired to be protected by Letters Patent is:

1. In a conveyor for a hydrostatic cooker or the like which includes a pair of spaced chains each of which is defined by a plurality of links pivotally connected together, the improvement which comprises a plurality of carrier bars, each carrier bar being connected between said chains to a pair of corresponding links of said chains and including a first wall supported by and lying in a plane parallel to the longitudinal axis of a pair of corresponding links, a pair of side walls connected to opposite edges of said first wall and diverging outwardly therefrom, and outwardly diverging flanges secured to the outer ends of each of said side walls, each of said side walls and said flanges being provided with a plurality of slots to define container retaining fingers therebetween, the fingers of adjacent side walls of two adjacent carrier bars projecting through the slots in the carrier bar disposed therebetween to define a carrier pocket which positively confine the containers therein when the carriers are moving along a linear path.

2. In a conveyor for a hydrostatic cooker or the like which includes a pair of spaced chains each defined by a plurality of links pivotally connected together, the improvement which comprises a plurality of carrier bars, each carrier bar being connected between said chains to a pair of corresponding links of said chains and including a first wall supported by and lying in a plane parallel to the longitudinal axis of a pair of corresponding links, a pair of side walls connected to opposite edges of said first wall and diverging outwardly therefrom, outwardly diverging flanges secured to the outer end of each of said side walls, each of said walls and said flanges being provided with a plurality of slots to define container retaining fingers therebetween, the fingers of adjacent side walls of two adjacent carrier bars projecting through the slots in the carrier bars disposed therebetween to define carrier pockets which positively confine the containers therein when the carriers are moving along a linear path, and means for guiding said carrier bars around a curved path whereby movement of said carrier bars around an inside curve of a radius which will cause adjacent carriers to deflect about 15° will cause said fingers to substantially close said carrier pockets, and whereby movement of said carriers around an outside curve of a radius arranged to cause said adjacent carriers to deflect about 30° will cause said fingers to be substantially withdrawn from the slots of the adjacent carrier bars to thereby open said pockets permitting containers to be fed into or discharged from the pockets.

3. A conveyor for a hydrostatic cooker or the like which includes a pair of spaced chains each of which is defined by a plurality of links pivotally connected together, the improvement which comprises an extension of each of said links defining a connecting portion projecting outwardly beyond both pivot points of said links, and an S-shaped carrier connected to the extension of each link of a pair of transversely aligned links and cooperating with the next adjacent carrier to define a pair of pockets for confining containers therein, said S-shaped carriers each including a pair of curved walls which project outwardly from opposite sides of the longitudinal centerlines of said aligned links, whereby lines drawn from the intersection of inner edges of said curved walls with said link centerline to the outer ends of said curved walls transcribe angles of approximately 22° from a plane perpendicular to the longitudinal axes of said aligned links, one of said curved walls being connected to each of said associated extensions at a point spaced forwardly from the next adjacent pivot point of said supporting links at a distance therefrom in excess of the pitch of said chains.

References Cited

UNITED STATES PATENTS

| | | | |
|---|---|---|---|
| 807,687 | 12/1905 | Schirmer | 198—131 |
| 1,652,277 | 12/1927 | Herold | 198—131 |
| 2,243,879 | 7/1941 | Meyer | 198—131 |
| 2,271,789 | 2/1942 | White | 198—170 |
| 2,774,460 | 12/1956 | Spoonhour | 198—131 |
| 2,893,536 | 7/1959 | Jones | 198—131 X |
| 2,970,684 | 2/1961 | Tangard | 198—131 |
| 3,182,786 | 5/1965 | Reimers | 198—131 |

FOREIGN PATENTS 950,085  2/1964  Great Britain

EVON C. BLUNK, *Primary Examiner.*

SAMUEL F. COLEMAN, *Examiner.*

R. M. WALKER, M. L. AJEMAN, *Assistant Examiners.*

UNITED STATES PATENT OFFICE
CERTIFICATE OF CORRECTION

Patent No. 3,347,351                         October 17, 1967

Samuel A. Mencacci et al.

It is certified that error appears in the above identified patent and that said Letters Patent are hereby corrected as shown below:

Column 3, line 48, "30" should read -- 20 --.

Signed and sealed this 16th day of September 1969.

(SEAL)
Attest:

Edward M. Fletcher, Jr.                    WILLIAM E. SCHUYLER, JR.
Attesting Officer                            Commissioner of Patents